US005448363A

United States Patent [19]

Hager

[11] Patent Number: 5,448,363

[45] Date of Patent: Sep. 5, 1995

[54] FOOD SORTING BY REFLECTION OF PERIODICALLY SCANNED LASER BEAM

[76] Inventor: Horst Hager, Husarenstrasse 76, 4790, Paderborn, Germany

[21] Appl. No.: 103,247

[22] Filed: Aug. 9, 1993

Related U.S. Application Data

[63] Continuation-in-part of PCT/EP92/02812, Dec. 5, 1992.

[51] Int. Cl.[6] .......... G01B 11/10; B07C 5/342

[52] U.S. Cl. .......... 356/386; 209/586; 209/587; 209/908

[58] Field of Search .......... 356/372, 375, 376, 379, 356/380, 383, 384, 385, 386, 387, 237, 407; 99/569, 584; 209/576, 577, 586, 579, 587, 598, 585, 939, 581, 582, 938, 908; 250/560, 561

[56] References Cited

U.S. PATENT DOCUMENTS

| | | | |
|---|---|---|---|
| 3,437,022 | 4/1969 | Hamonds, Jr. | 356/376 |
| 4,203,673 | 5/1980 | Buckson | 309/587 |
| 4,324,335 | 4/1982 | Conway et al. | 356/380 |
| 4,350,442 | 9/1982 | Arild et al. | 356/407 |
| 4,863,041 | 9/1989 | Bailey | 356/407 |
| 4,978,859 | 12/1990 | Ransheim | 356/386 |
| 5,090,576 | 2/1992 | Menten | 209/587 |
| 5,184,732 | 2/1993 | Ditchburn et al. | 356/376 |

FOREIGN PATENT DOCUMENTS

| | | |
|---|---|---|
| 4012038 | 10/1990 | European Pat. Off. . |
| 0402543 | 12/1990 | European Pat. Off. . |
| 2165943 | 4/1986 | United Kingdom . |
| 2173590 | 10/1986 | United Kingdom . |

*Primary Examiner*—Hoa Q. Pham

*Attorney, Agent, or Firm*—Browdy and Neimark

[57] ABSTRACT

In a machine for sorting food pieces such as potatoes the pieces are dropped one at a time through scanned laser beams that sequentially scan over its surface on all sides. Detectors measure laser light reflected from the food as the beam scans over the surface; variations indicate bad spots. To determine when the beam is not shining directly onto the food piece, a ribbon-like direct light detector is circumferentially deployed about the test zone. The reflected light is changed to electric signals and is analyzed by the microprocessor to decide if the food piece is to be deflected by an air jet. When the direct-light detector registers an un-interrupted laser beam, the microprocessor ignores the reflected light signals; that is, the direct light signal gates the reflected light signal. The reflected-light detector may be a bundle of up to 50 optical fibers having the fiber ends regularly disposed about the ring, so as to detect the light intensity at various evenly-spaced angles around the test zone. The direct-light detector may be a ribbon-like bundle of parallel fibers presenting an interior cylindrical surface. Each fiber is partially ground down on the back side so that laser light shining onto the fiber is scattered and internally reflected to the end of the fiber. Beam interruption may also be detected in the direct-light detectors by the high intensity of light.

20 Claims, 5 Drawing Sheets

FOOD SORTING BY REFLECTION OF PERIODICALLY SCANNED LASER BEAM

This application is a Continuation-in-Part of PCT/EP92/02812 filed on Dec. 5, 1992.

FIELD OF THE INVENTION

The present invention relates to optical sorting devices for food pieces such as fruits or potatoes.

BACKGROUND OF THE INVENTION

Apparatus for optical testing and sorting of objects, especially of food, which objects are serial conducted in free fall through a test zone, around which several light sources and reflex light receivers are arranged, light signals of which are transformed to electrical output signals which are compared in a controller with given lower and upper limits, thereby exeeding a control signal produced in a microprocessor, which controls a sorting shutter, which is arranged below the test zone.

This type of equipment is known from DE 36 14 400 C1, which shows optical test equipment intended for sorting objects, especially agrarian products like peas, beans, etc. All the objects are sorted out by a sorting shutter under the control of a fault signal. Inside the equipment the objects are illuminated by light sources distributed around the zone through which the objects fall. Light being reflected by the test objects is transmitted to light detectors. Signals from the light detectors are analyzed. The objects are illuminated by light bulbs which produce a total illumination of the objects, so that the light detectors register the object as a whole, including the background. As a result, the signals only give an overall result about the optical quality of the product, for example, the degree of ripeness. The damage spots, for example, a worm hole or a mold spot does not cause any indication within this equipment so that the operational usefulness of the device is limited. In addition, this equipment is only useful for the optical examination of dry objects because moist objects are shinny and the amount of light reflected from them depends on the angular relationship to the light detectors.

Another prior-art device is that of Key Technology Inc., USA, called Opti Sort (8/89). In this device the separated objects get scanned at high speed, from above by several electronic-cameras with opto-electrical line-transformers; which are called CCD-Arrays. Their signals get analyzed in relation to given boundary values. Due to the limited depth of focus of the camera-objective, this only allows, the exact registration of small objects with a fairly exact diameter or the same thickness, e.g. potatoe sticks. The camera equipment and the electronic analysis system demands great efforts and are very expensive.

The purpose of this invention is to reveal a relatively simple Optical Test-Equipment which safely analyses and sorts objects of extremely different sizes and different as well as surfaces with small shaped damages in different colours.

SUMMARY OF THE INVENTION

The light sources scan cyclically one after another in one deflection period around the objects an object-circumference-sector. The light receivers are optical fibers of a bundle, the end of which are conducted to an opto electrical reflectlight-transducer, the electrical output-signal of which is fed to the controller for comparison with the limits and for a further analysis.

The equipment allows the optical analysis of objects with different diameters and different shapes with a high resolving power, because during the free-fall pass through the test zone their whole surface is scanned in a closely distanced line format with relative thin laser rays of low dispersion.

Further, the light receiving equipment, consisting of the open ends of many optical fibers is oriented under different angles to the surface of the object and to the lasers and carries the received light to an electro-optical transducer to allow for discrimination of dry and moist-shiny surfaces, as the received light, which is the average of mainly all directions of the reflected light, removes the effects of glare.

The evaluation of different sized objects is made easy by the control of signal analysis. The direct laser light, which hits the side of opposite the laser, if there is no object, gets registered in separated light receiving instruments. Judgement of the reflecting light relation to the time of judgement of the signals, is gated by registered direct light.

Because of the construction of the reflecting lights and also of the direct lights with separated fiber cord bundles, the opto-electrical transducers consist of one photo diode each, and a very simple serial signal analysis is possible.

The high speed of modern electrical equipment allows the lasers, which scan each time an angle segment area of the objects, to activate cyclically one after another, whereby overlap of reflecting light of different lasers does not appear and only one single electronic chanel of analysis is needed for the signals of the line segments which appear one after another, produced by the separate lasers by turns.

The judgement of the reflecting light of one test object is done by a manifold analysis of the, which are gained signal sequences, which are related to the object. Preferably the following parameters are defined:

Accepted light intensity upper and the lower limits are adjustable; a lower allowable length of a defect signal in one length of the line segment; an upper allowable number of line segments with a defect signal at an object; and an upper allowable number of defects per given length of the object line. A defect at the scanned object that produces a signal out of the allowable limit of light is a defect signal.

It is the intention, to rinse the lasers and the deflection equipment permanently with cleaned air in the direction of the conveyor, so that next to a cooling effect a cleaning effect is reached that prevents dust depositions.

It is the intention of a more simple design, only to arrange one laser with one deflection equipment and several deflection mirrors in different angles, so that the different angle segments one after another, either directly or by the deflection, are covered.

The present invention is especially qualified for judging grade of quality and sorting of peeled objects, especially potatoes. It allows one to peel the potatoe only thin, and not like it was common up to now, to peel the potatoes down to a standard size, so that the waste is kept small and the refused potatoes, which still have bigger shaped damages or deep eyes, get fed for repeeling. By this also the peeling waste, which is expensive to depose, gets reduced under the usual 50%.

DESCRIPTION OF THE PREFERRED EMBODIMENTS

Figure 1:
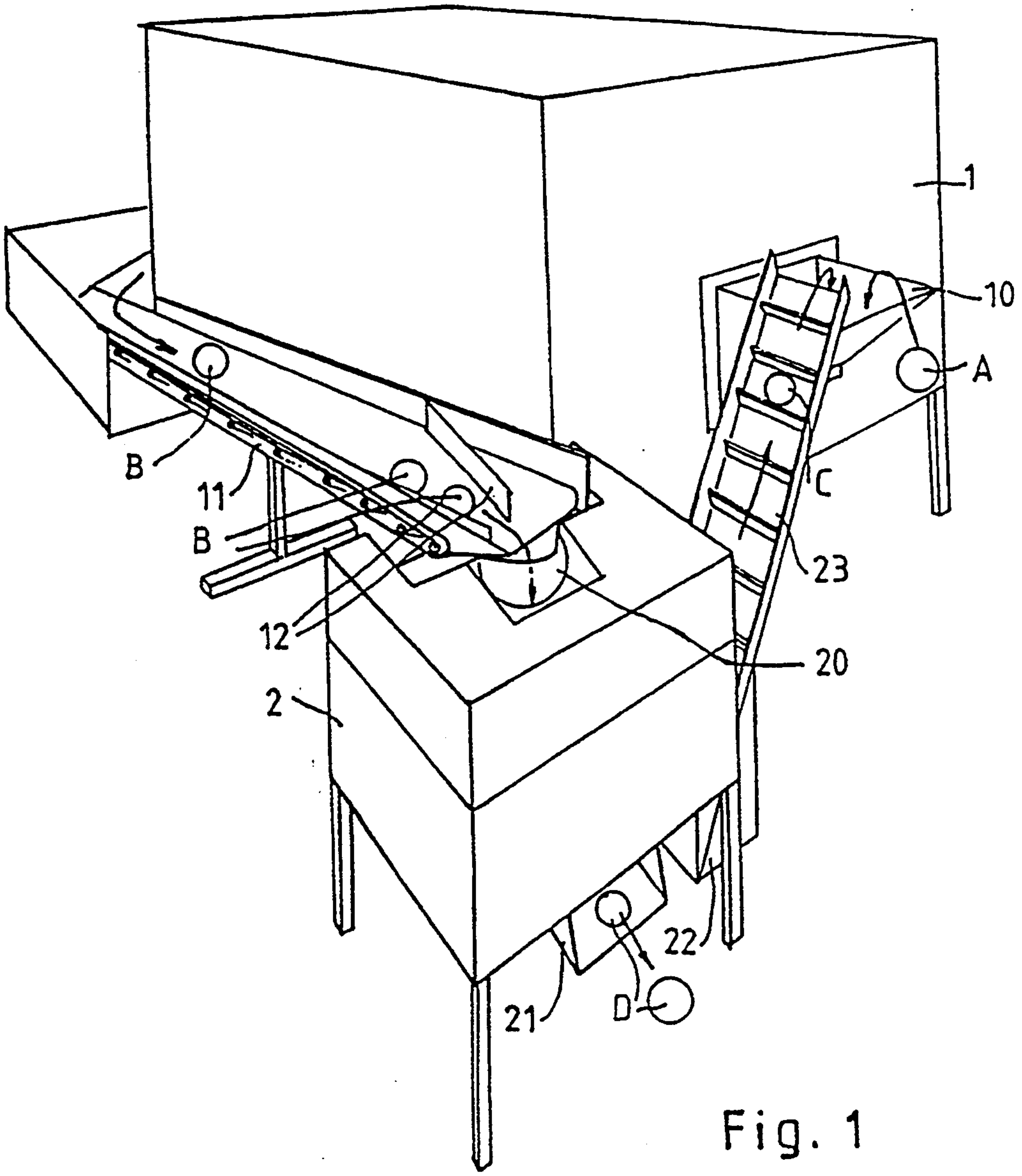
FIG. 1 shows a Potatoe-Peeling-Equipment with a Test- and Sort-Equipment.

FIG. 1 shows a Peeling-Equipment (1) that is conventional for thin peeling. The raw-product (A) get filled into the feeding-hopper (10). The peeled potatoes (B) leave the Peel-Equipment (1) on the other side to get carried by an elevator (11) and get passed through a separation-sluice (12) and one after another are feed from above to the inlet (20) of the Test- and Sort-Equipment (2). This shows a first direct outlet (21) at the bottom, through which the accepted peeled potatoes (D) are ejected and a second controlled outlet (22), which a conveyor (23) is tandem arranged to, that transports the refused potatoes (C) into the feeding hopper (10) of the Peeling Equipment (1), where the potatoes get repeeled.

Figure 2:
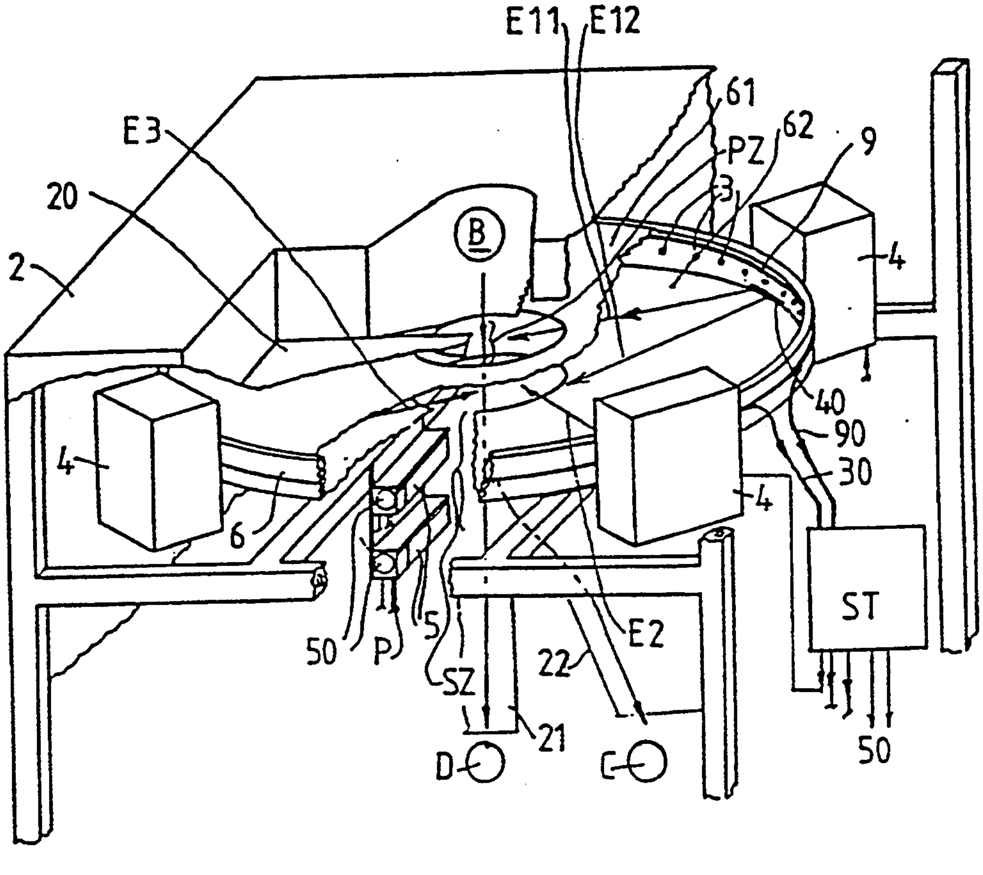
FIG. 2 shows the Test- and Sort-Equipment partially opened.

FIG. 2 shows the Test- and Sort-Equipment partially opened. The objects, the potatoes (B), which are to be optically judged, fall free through the test zone (PZ) and from there into the sorting zone (SZ), wherefrom the potatoes, if they are checked good, carry on falling and roll to the outlet (21) or they get turned by control operated jet-power (5) to the second outlet (22).

Around the test zone (PZ) a flat ring shaped case (6, 61, 62), which is opened inside, is arranged. On the outer side of the ring (6) are several laserscanners (4) surrounding, equally distributed arranged. Alternated laser-rays (E11, E12, E2, E3) enter through small slots (40) inside the interior of the ring and they cover the central area of the test zone (PZ) fanshaped, horizontally oscilating, so that the test objects (B) get scanned in whole and from each side.

For the registration of the laser light, which each time gets reflected from the test objects, the front end (3) of the optical fibers are radial disposed around the inner sides of the ring (6). The optical fibers are conducted externally and converge to a joint fiber bundle (30) towards the Analysis- and Control-Equipment (ST).

Also around the inner side of the ring (6) an optical ribbon (9) is arranged, which is arranged in a way that the laser ray (E11, E12, E2, E3) always falls directly onto it, if there is no test object (B) in the ray. i.e. if there is no test object in the test zone (PZ) or the laser is lateral deflected for the moment so far, that it misses the test object when it is deflected up to the edge of the test area. Also the optical ribbon (9) is collected to a bundle (90) and conducted to the control equipment (ST).

The control equipment (ST) activates the laserscanner (4) cyclical and it controls the valves (50) of the blow nozzles (5), which are fed with pressured air.

Figure 3:
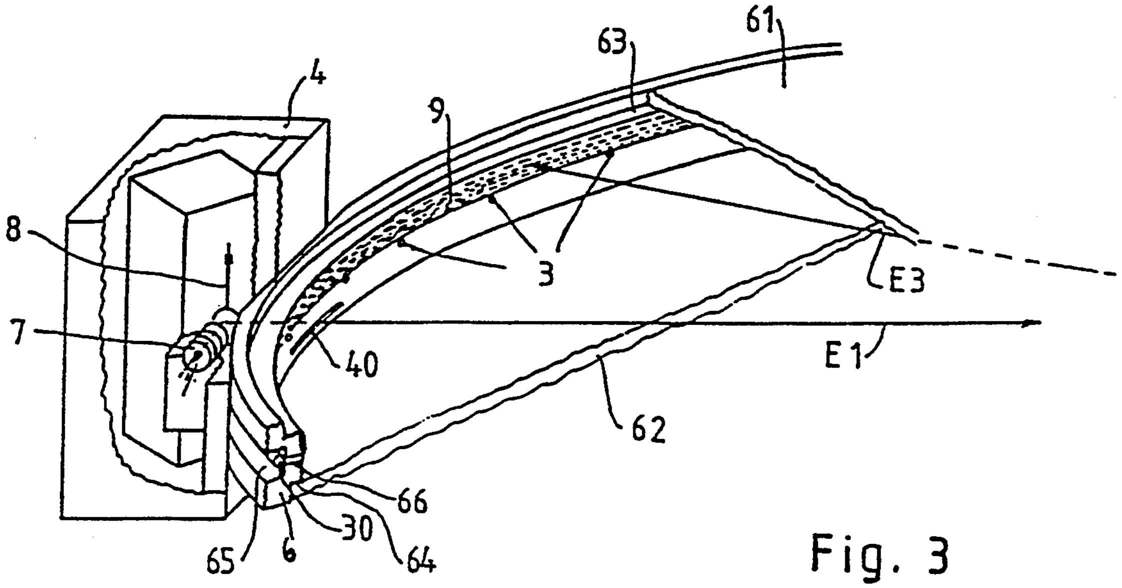
FIG. 3 shows a part of the Test-Equipment.

FIG. 3 shows an enlarged part of the Test-Equipment, partially opened. The laserscanner (4) consists of a laser diode (7). The laser ray is deflected through the mirror of an electro-magnetical scanner (8), which oscilates through a horizontal slot (40) inside the ring (6) into the interior of the ring. The interior of the ring is largely closed by a base-plate (62) and a cover plate (61), and there are only openings for the serial passage of the test objects. The front side of the ring (6) shows revolving steps (63, 64), where the cover- and base-plate (61, 62) get held in the center.

The side of the ring (6) shows at the outer surface a revolving groove (65) inside which the optical fiber cord bundle (30) is conducted, and from where the optical fiber cord ends (3) are branched through holes (66) inside the ring. Inside of the circumference of the ring (6) up to 50 optical fiber ends are evenly disposed, so that light, which gets reflected in various directions, strikes the different optical fibers (3) and is concentrated by the optical fiber bundle (30).

In the area of the direct laser beam (E3) the optical ribbon (9) is arranged above the optical fiber ends (3). The optical fibers of the ribbon are arranged so closely adjacent and have such a small diameter, that the laser constantly, if it does not strike a test object, strikes at least one optical fiber of the ribbon (9).

Figure 4:
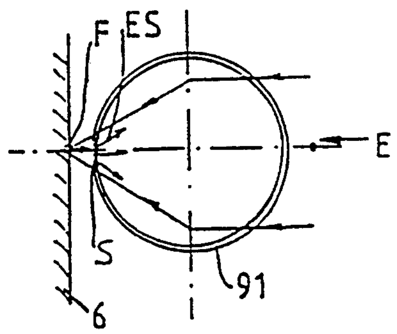
FIG. 4 shows the enlarged cross-section of the optical fiber for the direct laser sensing with a scheme of the rays.

FIG. 4 shows the schematized rays in an optical ribbon (9). The laser (E) penetrates the fibers (91) radially and gets focused by the cylinder lens effect of them. The focus (F) is placed on the other side of the fiber (91). In the area of the rays outlet the fibers (91) are made rough by grinding (S), so that there striking light from inside gets distributed as stray light (ES) from there and also coming back light of the reflecting side of the ring (6) gets distributed as stray light (ES) inside the ribbon (9).

Figure 5:
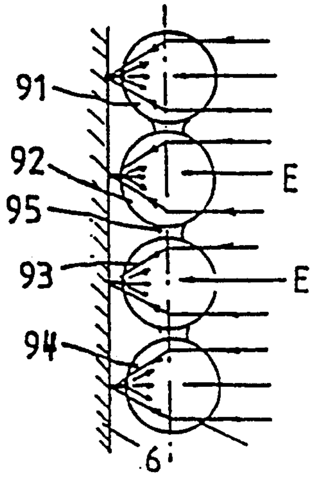
FIG. 5 shows an enlarged cross-section of the optical ribbon.

FIG. 5 shows an enlarged part of the ribbons fibers comprising the ribbon (9) in cross section with the schematized laser beam (E). Each fiber (91, 92, 93, 94) is connected with the next one by thin cross pieces (95) and so they get held at a definite short distance from each other.

Figure 6:
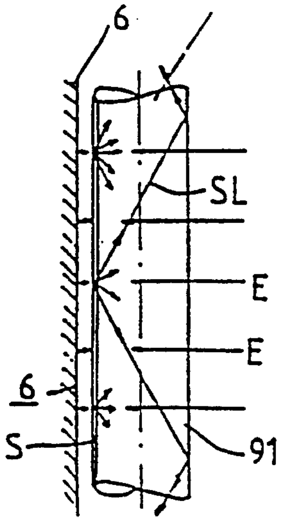
FIG. 6 shows an enlarged top view on the optical ribbon with the rays inside.

FIG. 6 shows an enlarged top view onto the ribbon (9) with the laser-ray. The incident laser-ray (E) and the reflected light from the side of the ring (6) is, because of the grindings (S) of the fiber, in some cases dispersed as stray light and passed along to the fiber by total reflection of the fiber and the light is transmitted to the end of the optical fibers (91), where the there arriving light gets analyzed.

Figure 7:
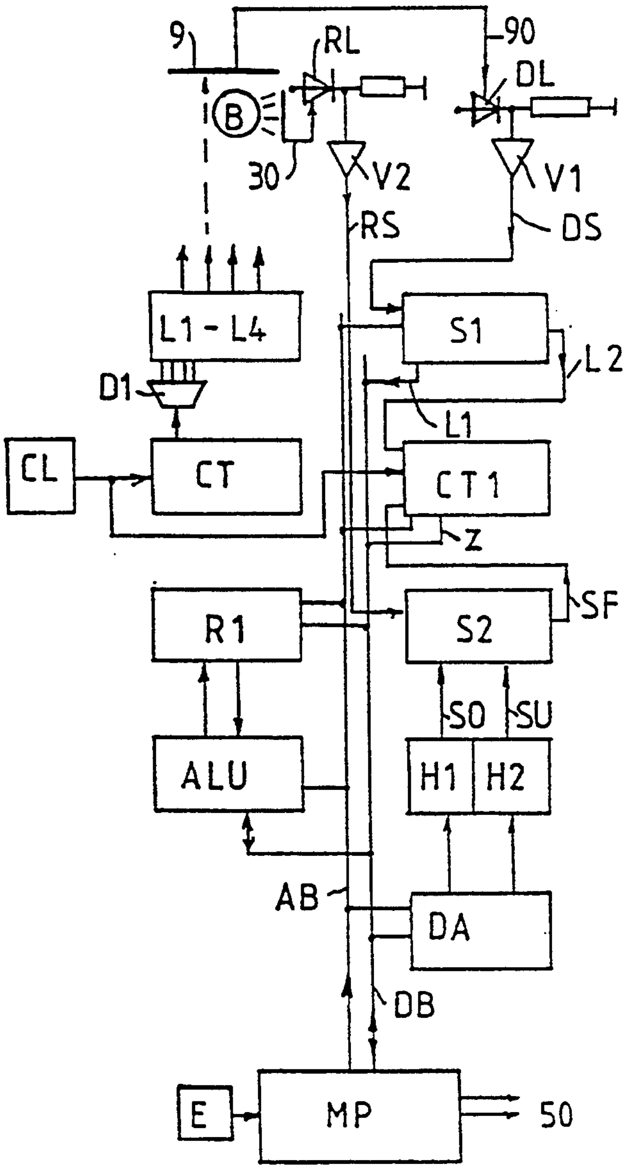
FIG. 7 shows the block wiring diagram of the Signal-Analysis-Equipment.

FIG. 7 shows the controller (ST) in a block diagram. This consists of a program-controlled microprocessor (MP), that controls electronic circuits via an adress bus (AB) and via a data bus (DB) and supplies these circuits with dates and gets dates from them.

The circuits external to the microprocessor (MP) are intended to be used at the speed of processing, which is common nowadays to get a sufficient speed of processing, necessary for the optical judgements of the free falling objects (B). If faster microprocessors are available for reasonable prices, so it is possible to realize the functions of the external circuits complete or partially also directly in such processors.

The temporal control of the functional course in the controller (ST) occurs by an electronic clock (CL). This controls a counter, which most significant position controls the four lasers (L1–L4) successively via a decoder (D1).

If there is no object (B) inside the laser beam, the ray is picked up by the optical ribbon (9) and is conducted by a fiber bundle to the direct optical receiver (DL), which is coupled to the ribbon (9).

The amplified direct light signal (DL) gets analyzed in a first comparator (S1), that transmits a gate signal at appearance of the direct light, that signals no presence of an object (B) in the laser beam.

If there is an object (B) in the laser beam, reflex light is produced, which is sensed up by the optical fibers (30) and is conducted to the reflex light receiver (RL), where it is electrically transformed, gets intensified in a second amplifier (V2) and then is compared in a second comparator (S2) with a given top- and bottom value (SO, SU). These particular values (SO, SU) are received from the microprocessor (MP) via the data bus (DB) one after another, through a digital analog converter and the analog signals get stored in two sample and hold circuits (H1, H2) and get conducted to the second comparator (S2) from there.

The output signal of the second comparator (S2) is a signal of error (SF), which shows that the allowable signal range between the given limits (SO, SU) of light intensity is remained under or overstepped.

If the gap signal (L2) and the signal of error (SF) is existing, a counter (CT1) is started, where contents (Z) are consequently a proportion for the size of the signal of error.

The contents (Z) of the counter are stored in a register block (R1), controled by the microprocessor (MP) and compared via a arithmetic logic unit (ALU) with a given relative value. Is an overstepping of the limit established at the same time, the microprocessor (MP) gives control signals to the switch-control (50).

It is the intention to check whether either a single fault spot oversteps a maximum length or whether the quantity of the fault spots or whether the sum of the fault spots length of one object or one segment, which were established by only one scanning process of one of the lasers, overstep further related top limits. The presence of one object in the scanning-area is signalled each time by the end of the gate signal (L1) to the microprocessor.

The described function of this circuit would be realized instead of by the arithmetic logic unit (ALU) and register block (R1) alternatively through presettable counter, which is presetted with the upper limit value and is counted down during the signal of error (SF) and delivers a zero crossing signal to the microprocessor (MP).

The microprocessor (MP) is, for the input of the limits and the relative values and the programmes, connected to an input facility in a known way and is equipped with a program- and data storage unit. By this the equipment is adjustable easily to the test conditions of specific goods.

It is also possible to sense both the direct light and the stray light with the same homogeneous optical fiber, especially with an optical ribbon. Because the direct light produces a higher light intensity at the receiver than the stray light, the gate signal also can be obtained from the same receiving signal as the signal of error, by conducting the receiving signal to another comparator with a higher value. By this only one optical ribbon and one opto-electrical transducer is needed.

Further it is possible to scan the whole circumference of the object with a reduced number of laserscanners, if in a part of the scanner deflection, which is arranged next to the test zone, a mirror would be installed, which turns the laser array onto a different segment of the circumference of the object. It is also practicable to arrange deflection mirrors at both sides of the test zone, so that at a scanner-cycle the object gets scanned fanlike in three different basic directions.

The control of the scanner reflection mirrors occurs preferably by linear increasing and linear decreasing currents in galvanometer coils, so that an about linear relation between the period of the signal of error and the extent of a damage spot exists. In consequence the counting of the temporal impulses during the period of a signal of error produces a counting result, which is in accordance with the size of the damage. If the deflection chosen is a sinusoidal, it is recommended for the limitation of the linearity error to deflect more than needed, so that only the middle, fairly linear area is used as the test zone.

The deflection speed which is chosen should allow universal object scanning, consequently the whole cyclical sequence of all laser scannings happens in a time, in which the test object has run through a distance in the test zone equivalent to the thickness of a laser beam. The scanning areas join without a gap to each other by this.

As an alternative to sector sampling of the lasers, it is possible to have lasers switched over by the clock so that the laser beams spots are spatially adjacent at the switchover point. If the deflection distance during a laser cycle is about the same as the diameter of the laser beam the laser spot, scanning over a spot continuous.

The signals of error are analyzed then in a time multiplex fashion where the counters are related each to single laser. The contents of the counter which are gained like that get analyzed in the descibed way.

It has proved advantageous to arrange the scanner area of the various lasers in different directions against the direction of movement of the objects, slightly inclined and/or slightly staggered. This results in a beneficial registration of the beams in the direction of movement of the object, as these beams get scanned from one laser to the next at the inclination angle.

It is also possible to design the equipment in a specific way, that rotating objects get completely scanned, as at least two laser arrangements are placed staggered one behind the other in the direction of movement of the objects for about half of a circumference of an object. The lightreceivers or at least the opto electrical transformers get used advantageously together for both arrangements, wherefore all lasers are switched on one after another and the optical fibers are joined together. One scanning arrangement and the optical registration only surround a limb just over 180°.

Another advantageous design consists in, that a second optical ribbon as an optical reflect sensor is arranged parallel to the first ribbon as the direct beam sensor sensor and that these ribbons or at least one of them is doped with a fluorescent-material, which absorbs the laser light which transforms it into light of longer wavelength and lower energy. This reemitted light is emitted inside the fiber at random angles and thereby is trapped inside the optical fiber and conducted to the transducer. The transducer may be selected for its spectral sensitivity. With the use of such fluorescent-material doped optical fiber ribbons, it is possible to renounce not only grinding and a spaced installation in front of a reflecting screen, but also separation of the ends of the optical fibers of the bundle; a parallel arrangement of the fibers in the laser beam area of the ring is sufficient. If laser diodes are used, which deliver relative long-waved light, a qualified fluorescent-material for the doping is to be chosen; The doping-materials which are used in commercial optical fibers only respond to UV-light up to visible light of the average range of the wave-length.

I claim:

1. An apparatus for optical testing and sorting of a free-falling object, comprising:

deflection means for deflecting the object for sorting;

a test zone disposed above said deflection means, said test zone at least partially light-shielded from ambient light;

a laser scanner means for producing and periodically scanning a laser beam in a line across said object when said object is within said test zone;

an optical detector means for detecting light from the laser scanner within the test zone, said detector means including transducer means for converting light into an electrical photometric signal;

comparator means comprising a first and second comparator, coupled to said optical detector, for comparing said photometric signal with limit values and generating thereby a control signal; and processing means for accepting said control signal, analyzing said control signal, and generating thereby a shutter signal to operate said deflection means, selectively to deflect the object and not deflect the object, depending upon criteria incorporated into said processing means;

said line across said falling object encircling said object and said laser scanner further comprising means for sequentially scanning said laser beam from various directions onto said object, whereby different circumferential sectors of said object are sequentially scanned;

said optical detector means further comprising a direct-light detector and a reflected-light detector;

said direct-light detector further comprising a ribbon disposed within the test zone, said ribbon further comprising an array of closely-adjacent, parallel linear light traps, each one of said light traps adapted to receive light through a side and convey light along a length of said light trap to a light trap end adjacent said transducer means.

2. The apparatus according to claim 1, wherein said laser scanner means further includes:

a plurality of laser scanners deployed about said test zone; and means for sequentially operating said plurality of laser scanners over said different circumferential sectors of said object.

3. The apparatus according to claim 1, wherein each said one of said light traps further comprises an optical fiber having a generally circular cross section, the optical fiber including a polished surface and a rough-ground surface distal said test zone, said rough-ground surface extending along a length of said optical fiber, whereby light from said test zone may enter said light trap, internally converge from said polished surface toward said rough-ground surface, reflect diffusely from said rough-ground surface, and internally reflect from said polished surface to travel to said light trap end.

4. The apparatus according to claim 1, wherein said comparator means further comprises a first comparator and a second comparator, said control signal further comprises a gate signal and an error signal, said ribbon is circumferentially disposed about said test zone at a level to intercept said laser beam when said laser beam does not impinge on said object, said photometric signal from said transducer means is coupled to said first comparator, and said first comparator outputs said gate signal to control said second comparator.

5. The apparatus according to claim 1, wherein said reflected-light detector further comprises a plurality of optical fibers having light-accepting ends surrounding said test zone and radially directed toward said test zone, said plurality of optical fibers gathered into a bundle; and wherein said transducer means is disposed at a bundle end distal said light-accepting ends.

6. The apparatus according to claim 5, wherein said test zone further comprises a ring-shaped casing and wherein said light-accepting ends are disposed with said ring-shaped casing and said bundle is disposed outside said ring-shaped casing.

7. The apparatus according to claim 6, further including radially-drilled holes wherein said fibers are disposed.

8. The apparatus according to claim 6, wherein said light-accepting ends are disposed in equal angular relationship about a vertical axis proximal the object.

9. The apparatus according to claim 5, wherein said test zone further comprises a ring-shaped casing.

10. The apparatus according to claim 9, wherein said casing includes generally horizontal slots through which said laser beam is scanned.

11. The apparatus according to claim 9, further including, to fit over said casing, selectively a top cover and a bottom cover, said top cover and bottom cover each including an aperture adjacent said test zone for passage of said object.

12. The apparatus according to claim 1, wherein,:

said light from the laser scanner within the test zone further comprises direct laser beam light and reflected light;

said optical detector means further comprises:

a direct-light detector outputting a first photometric signal and a reflected-light detector outputting a second photometric signal;

said comparator means further comprises:

a gating comparator coupled to said direct light detector to receive said first photometric signal and a reflex comparator coupled to said reflected-light comparator to receive said second photometric signal;

said control signal further comprises:

a gate signal of said gating detector, said gate signal indicating absence of the object, and;

an error signal of said reflected-light comparator, said error signal indicating a bad spot on the object;

said processing means includes a clock for emitting clock pulses;

said processing means includes means for counting said clock pulses, during a counting interval when said gate signal is absent and said error signal is present, to produce a count; and said criteria incorporated into said processing means include a count criterion.

13. The apparatus according to claim 12, wherein:

said limit value further comprises an upper limit value and a lower limit value, and an error signal is present if said second photometric signal is less than said lower limit value or greater than said upper limit value.

14. The apparatus according to claim 12, wherein:

said line across said falling object encircles said object and said laser scanner further comprises means for sequentially scanning said laser beam from various directions onto said object, whereby different circumferential sectors of said object are sequentially scanned; and said count is summed into a register count corresponding to respective ones of said circumferential sectors.

15. The apparatus according to claim 12, wherein:

said criteria incorporated into said processing means include a comparison of said count with a maximum count value.

16. The apparatus according to claim 12, wherein:

said count criterion includes selectively a maximum allowable count and a maximum number of a plurality of the interval for the object.

17. The apparatus according to claim 1, wherein said laser beam is inclined to a direction of motion of the object within said test zone.

18. The apparatus according to claim 17, wherein said line across said falling object encircles said object and said laser scanner means further comprises means for sequentially scanning said laser beam from various directions onto said object, whereby different circumferential sectors of said object are sequentially scanned, said laser scanner means further includes a plurality of laser scanners deployed about said test zone and means for sequentially operating said plurality of laser scanners over said different circumferential sectors of said object, and in said different circumferential sectors said beam is staggered.

19. The apparatus according to claim 18, wherein said laser scanners are operated in multiplex.

20. The apparatus according to claim 1, wherein said laser beam is periodically scanned at a frequency such that the object falls less than the width of said laser beam during one scan.

* * * * *